United States Patent [19]

Takamatsu et al.

[11] Patent Number: 4,628,498
[45] Date of Patent: Dec. 9, 1986

[54] DISC LOADING APPARATUS FOR USE IN A DISC PLAYER

[75] Inventors: Ryoji Takamatsu; Kouji Umezawa, both of Kanagawa; Tsutomu Toyoguchi, Tokyo, all of Japan

[73] Assignee: Sony Corporation, Tokyo, Japan

[21] Appl. No.: 729,122

[22] Filed: Apr. 30, 1985

[51] Int. Cl.⁴ .......................... G11B 1/00; G11B 17/04
[52] U.S. Cl. .................................. 369/77.1; 369/194; 369/263
[58] Field of Search ..................... 369/75.1, 75.2, 194, 369/77.1, 263

[56] References Cited

U.S. PATENT DOCUMENTS

| 3,846,836 | 11/1974 | Masse et al. | 369/194 |
| 3,899,181 | 8/1975 | Dannert et al. | 369/194 |
| 4,098,510 | 7/1978 | Suzuki et al. | 369/75.1 |
| 4,507,768 | 3/1985 | Ikedo et al. | 369/194 |

FOREIGN PATENT DOCUMENTS

| 2218398 | 10/1973 | Fed. Rep. of Germany | 369/194 |
| 70802 | 6/1978 | Japan | 369/77.1 |
| 2141862 | 1/1985 | United Kingdom | 369/77.1 |

Primary Examiner—Steven L. Stephan
Attorney, Agent, or Firm—Hill, Van Santen, Steadman & Simpson

[57] ABSTRACT

A disc loading apparatus for use in a disc player comprises an arm device supported by a stationary structure to be movable for loading a disc carried to a predetermined position on a disc rotating device mounted on a chassis supported by a resilient supporting member engaging with the stationary structure and unloading the disc from the disc rotating device, first and second rollers for carrying the disc to the predetermined position, and a locking mechanism provided between the chassis and the stationary structure for locking the chassis to be substantially fixed to the stationary structure in response to the movement of the arm device for disc loading or disc unloading.

6 Claims, 9 Drawing Figures

DISC LOADING APPARATUS FOR USE IN A DISC PLAYER

BACKGROUND OF THE INVENTION

1. Field of the Invention

The present invention relates generally to a disc loading mechanism for loading a disc used for information recording or information reproducing on a disc driving device causing the disc to rotate, and more particularly, to a disc loading apparatus for use in a disc player in which a disc rotating device is mounted on a movable chassis supported by a resilient member engaging with a stationary structure to be automatically loaded with a disc thereon.

2. Description of the Prior Art

Several disc loading apparatus have been proposed for loading a disc used for recording or reproduction of an information signal on a disc rotating device provided in a disc player. One of these disc loading apparatus, which has been offered for miniaturizing the disc player, is constituted with a loading arm member supported on a stationary structure, such as a frame, to be rotatable, a driving roller attached to the loading arm member to be driven to rotate, and an idling roller attached to the stationary portion to be located above the driving roller. In the operation of such a disc loading apparatus, first, the loading arm member is so positioned that the driving roller is contiguous to the idling roller and driven to rotate thereat, and a disc is put between the driving roller and the idling roller to be carried to a position above the disc rotating device by means of the rotation of the driving roller. Then, the loading arm member is rotated to cause the driving roller to descend from the position contiguous to the idling roller, so that the disc which is put on the driving roller descends also together with the driving roller and engages with the disc rotating device. After that, the disc is clamped on the disc rotating device with a disc clamping device which, for example, engages indirectly and magnetically with the disc rotating device through the disc put therebetween, and the loading arm member is further rotated to cause the driving roller to descend more so as to be remote from the disc clamped on the disc rotating device. In such a manner as mentioned above, the disc is automatically loaded on the disc rotating device.

In general, it is feared that the disc player is hindered from performing the proper recording or reproducing operation by vibration or shock inflicted thereon from the outside. Therefore, it is desired that, in the disc player, a chassis on which a recording or reproducing mechanical arrangement including a disc rotating device for rotating a disc and a recording or reproducing head device provided to face to the disc put on the disc rotating device are mounted, is supported by a resilient supporting member, such as a spring, engaging with a stadionary frame so as to be movable in relation to the stationary frame for absorbing vibration or shock inflicted on the disc player and preventing the same from acting upon the recording or reproducing mechanical arrangement.

However, in the case where the disc player employing such a disc loading apparatus as mentioned above is constituted to have a chassis on which the disc rotating device is mounted and which is supported by a resilient supporting member engaging with a stationary frame therein, it is feared that the situation in which the disc is wounded by some moving portion contacting thereto or is not carried to the disc rotating portion is caused when vibration or shock in relatively large degree is inflicted on the disc player in which the disc loading or unloading operating is being carried out. That is, since the disc is supported on the side of the stationary frame to be positioned to face to the disc rotating device mounted on the chassis supported by the resilient supporting member engaging with the stationary frame or to be moved toward the position above the disc rotating device when the disc loading or unloading operating is being carried out, if the stationary frame is moved by the vibration or shock inflicted on the disc player, the disc which is supported on the side of the stationary frame is moved to be close to and remote from the chassis and is likely to run into the disc rotating device projecting from the chassis to be wounded thereby or be prevented from being carried to the position above the disc rotating device.

Further, if the stationary frame is moved by the vibration or shock inflicted on the disc player in the situation where the driving roller is not caused to be remote sufficiently from the disc clamped on the disc rotating device after the disc is carried to the disc rotating device, the driving roller moving together with the stationary frame is likely to run into the disc on the disc rotating device to wound the same.

In the case where the disc clamping device is made to be pulled apart from the disc rotating device by a releasing device connected with the stationary frame so as to release the disc from clamp in the disc unloading operation, if the stationary frame is moved by the vibration or shock inflicted on the disc player in which the disc unloading operation is being carried out, it is further feared that the disc clamping device is moved, together with the stationary frame, toward the disc rotating device to resist to be pulled by the releasing device apart from the disc rotating device, and therefore the releasing device can not cause the disc clamping device to be apart from the disc rotating device.

In view of the above, in the case of the disc player employing the disc loading apparatus as aforementioned, it is desired that the chassis on which the disc rotating device is mounted is supported by the resilient supporting member engaging with the stationary frame and, in addition, the relative movement between the chassis and the stationary frame is prevented from causing during the period of the disc loading or unloading operation.

OBJECTS AND SUMMARY OF THE INVENTION

Accordingly, it is an object of the present invention to provide a disc loading apparatus for use in a disc player which avoids the foregoing disadvantages and problems encountered with the prior art.

Another object of the present invention is to provide a disc loading apparatus for use in a disc player which can load automatically and surely a disc used for information recording or information reproducing on a disc rotating device mounted on a chassis supported to be movable by a vibration-proof resilient member engaging with a stationary structure in the disc player.

A further object of the present invention is to provide a disc loading apparatus for use in a disc player which can load automatically and surely a disc on a disc rotating device mounted on a chassis supported to be movable by a vibration-proof resilient member engaging with a stationary structure in the disc player, and further can prevent, with a relatively simple mechanism, the chassis from moving in relation to the stationary structure when the disc is in the state of loading or unloading.

According to an aspect of the present invention, there is provided a disc loading apparatus for use in a disc player comprising an arm device supported by a stationary structure to be movable to take first and second positions selectively, a first roller attached to the stationary structure to be rotatable, a second roller attached to the arm device to be rotatable for being rotated to move a disc placed to come into contact therewith to a predetermined position corresponding to a disc rotating device on which the disc is to be loaded in cooperation with the first roller when the arm device takes the first position, and locking mechanism including an engaging member provided on a chassis which is supported by a resilient supporting member engaging with the stationary structure and on which the disc rotating device and a recording or reproducing head device provided for facing to the disc loaded on the disc rotating device are mounted and a locking member provided on the stationary structure for engaging with the engaging member to lock the chassis to the stationary structure when the arm device is positioned on the way from the first position to an intermediate position where the arm device puts the disc on the disc rotating device and for disengage with the engaging member to release the chassis from lockup to the stationary structure in response to the movement of the arm device to the second position from the intermediate position.

In the disc loading apparatus thus constituted in accordance with the present invention, the arm device is moved to perform loading of the disc on and unloading of the disc from the disc rotating device mounted on the chassis supported by the resilient supporting member, and the locking mechanism is controlled by the arm device in process of the movement thereof for loading the disc on or unloading the disc from the disc rotating device so as to lock the chassis to be fixed to the stationary structure. Therefore, with a relatively simple mechanism, the disc is loaded on or unloaded from the disc rotating device on the chassis which is surely locked to be fixed to the stationary structure when the disc loading or unloading operation is carried out, and consequently, such problems that the disc is wounded by the disc rotating device running thereinto or is prevented from being moved to the disc rotating device by the disc rotating device on the occasion of the disc loading operation and the disc is not be able to be released from clamp on the disc rotating device on the occasion of the disc unloading operation are not caused even when vibration or shock is inflicted from the outside on the disc player in which the disc loading or unloading operation is being carried out. Further, the locking mechanism is also controlled by the arm device to release surely the chassis from lockup to the stationary structure so as to cause the resilient supporting member to operate effectively between the chassis and the stationary structure after the disc is loaded on the disc rotating device, so that resistibility against vibration of the disc player is increased on the occasion of the recording or reproducing operation. Accordingly, the disc loading apparatus of the present invention is especially suitable for being employed in disc player installed in automobiles which tend to be often affected with vibration or shock.

The above, and other objects, features and advantages of the present invention will become apparent from the following detailed description which is to be read in conjunction with the accompanying drawings.

DESCRIPTION OF THE PREFERRED EMBODIMENT

Now, one embodiment of disc loading apparatus for use in a disc player according to the present invention will be described in detail with reference to the accompanying drawings hereinafter.

Figure 1:
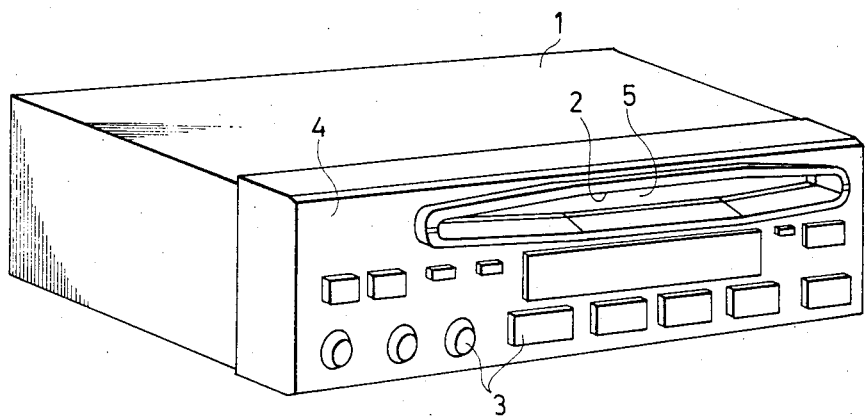
FIG. 1 is a perspective view showing the exterior of an optical disc player to which one embodiment of disc loading apparatus according to the present invention is applied.
Figure 2:
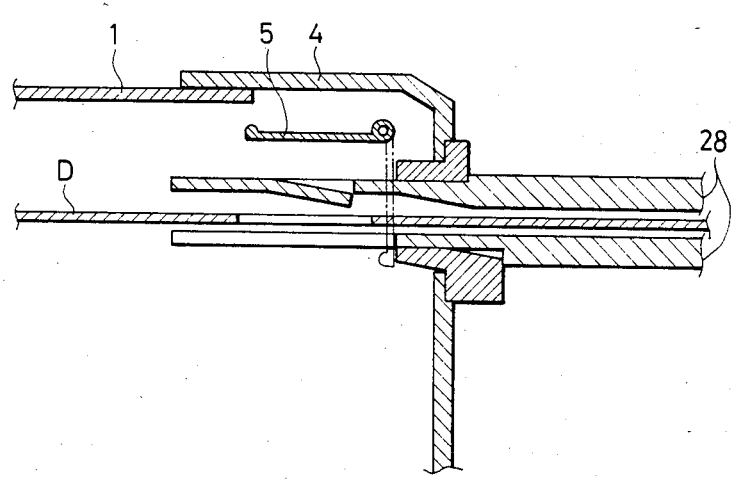
FIG. 2 is a partial sectional view showing a portion of the optical disc player shown in FIG. 1 where an opening for disc insertion is provided.

First, an example of disc players to which the disc loading apparatus according to the present invention is applied will be briefly explained. An example of the disc loading apparatus according to the present invention is applied to an optical disc player having the exterior thereof as shown in FIG. 1. This optical disc player has a housing 1 which is provided with an opening 2 for disc insertion and a control panel 4, on which several control buttons 3 are mounted, on the front wall thereof. As shown in FIG. 2, at the inside of the opening 2, a lid 5 is provided to be made open by a disc D contained in a case 28 when the disc is inserted through the opening 2 into the housing 1 together with the case 28.

Figure 4:
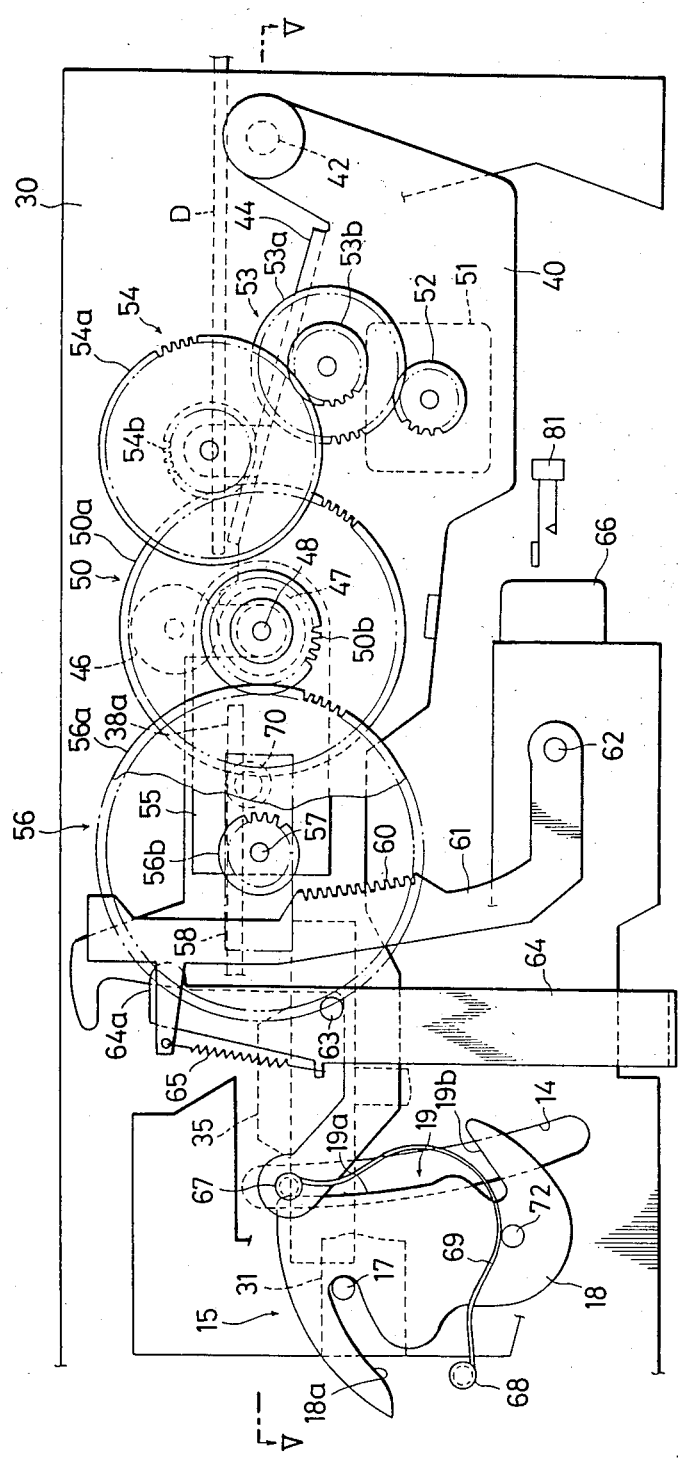
FIGS. 4 and 6 are side views showing portions of the embodiment shown in FIG. 3.
Figure 5:
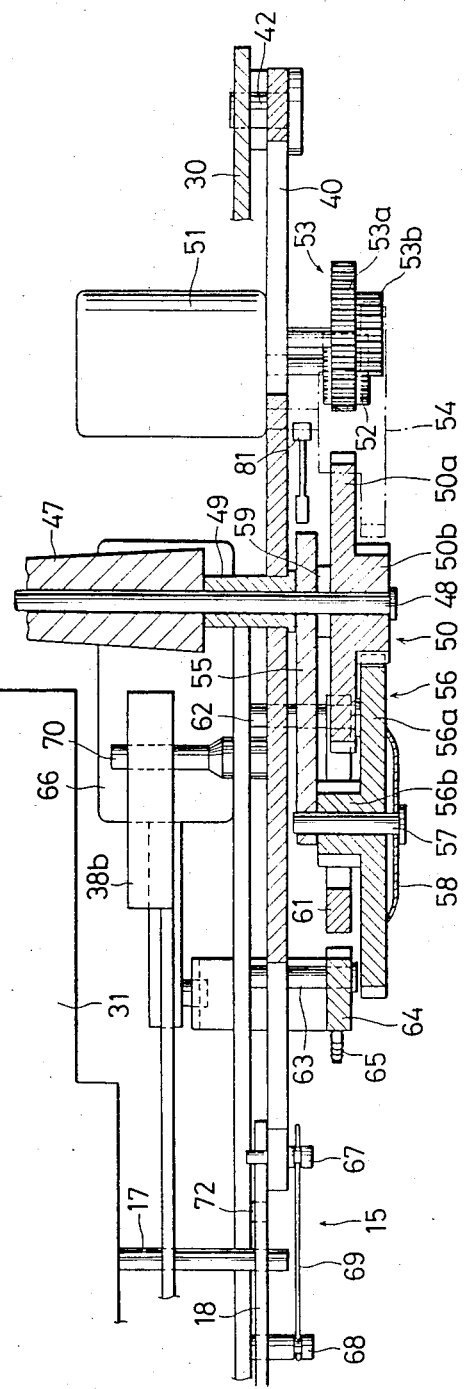
FIG. 5 is a sectional view in accordance with a line V—V in FIG. 4.
Figure 6:
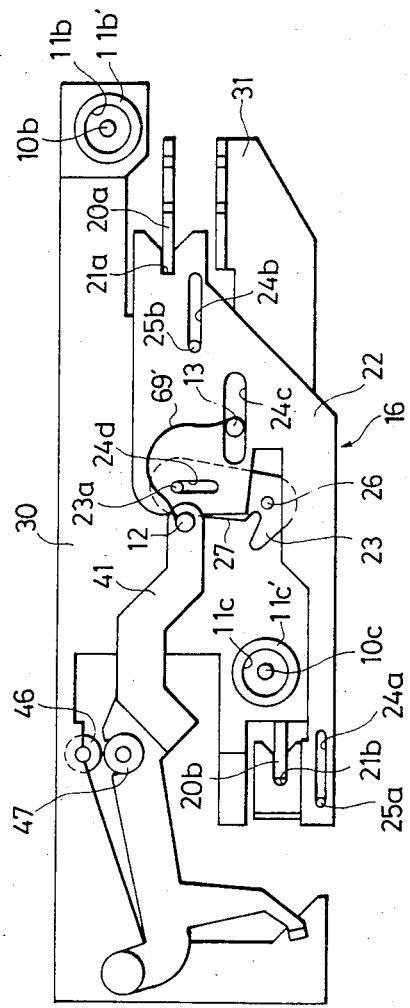

FIGS. 3, 4, 5 and 6 show the example of the disc loading apparatus according to the present invention employed in the disc player shown in FIG. 1. In this example, a frame 30 is provided as a stationary structure in the housing 1 shown in FIG. 1, and a chassis 31 is supported by several springs 32 and 33 provided between the frame 30 and the chassis 31 so as to be movable in relation to the frame 30. These springs 32 and 33 are operative to keep the chassis 31 stable when the chassis 31 is in the state of repose and only two of them are shown in FIG. 1. The chassis 31 has pins 10a, 10b and 10c projecting therefrom to be inserted into holes 11a, 11b and 11c formed on the frame 30, respectively, and is able to move within a range wherein the pins 10a, 10b and 10c can move in the holes 11a, 11b and 11c, respectively. The pin 10a and the hole 11a are shown in FIG. 1, and the pins 10b and 10c and the holes 11b and 11c are shown in FIG. 6. The holes 11a, 11b and 11c are surrounded by cushion rings 11a', 11b' and 11c', respectively. With such a structure, vibration or shock inflicted on the frame 30 from the outside is absorbed to be prevented from acting upon parts and members mounted on the chassis 31 to form, for example, a reproducing mechanical arrangement including a reproducing head device.

A disc rotating device 35 which is driven by a spindle motor is mounted on the chassis 31 and an optical reading head device 37 is attached to the chassis 31 to move within a opening 36 formed on the chassis 31 to read an information signal from the disc D loaded on the disc rotating device 35 and rotated thereby. On the chassis 31, a clamping device 38 is also mounted to swing vertically in relation to the chassis 31 with a clamping plate 39 for magnetically clamping the disc D on the disc rotating device 35 which is supported to be rotatable by the end portion of the clamping device 38 at a position above the disc rotating device 35. The clamping device 38 is biased by a certain spring (not shown in Figs.) to tend to be close to the disc rotating device 35 and therefore the clamping plate 39 is always forced to tend to come into contact with the disc rotating device 35. However, the clamping plate 39 is usually held at the position above the disc rotating device 35 by such a mechanism as mentioned later. A couple of pin-shaped stoppers 38a are projecting downward from the clamping device 38 to restrict the movement of the disc D when the disc D has been carried to a position corresponding to the disc rotating device 35, and a photo-interrupter 80 is mounted on the chassis 31 for detecting the disc D carried to the position corresponding to the disc rotating device 35.

Figure 3:
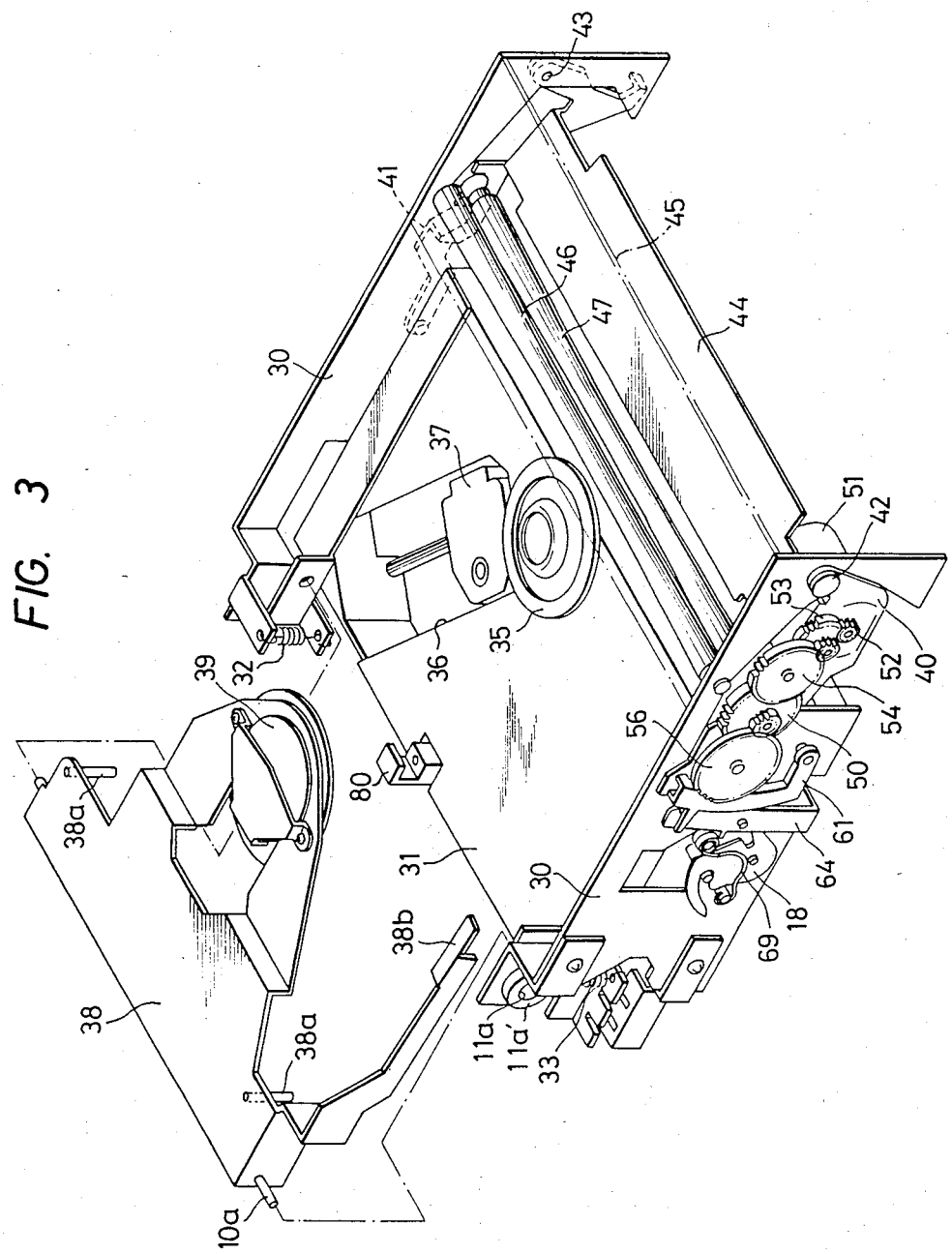
FIG. 3 is an exploded view in perspective showing one embodiment of disc loading apparatus according to the present invention.

As shown in FIG. 3, at the location near the opening 2 for disc insertion provided on the housing 1, loading arm members 40 and 41 are attached to be rotatable through pins 42 and 43, respectively, to the frame 30 and connected to each other through a movable guide plate 44, and a stationary guide plate 45 is fixed to the frame 30 to face to the movable guide plate 44. The disc D from the opening 2 providdd on the housing 1 is inserted into a space formed between the movable guide plate 44 and the stationary guide plate 45.

An idling roller 46 and a driving roller 47 are provided to receive the disc D having passed through the space between the movable guide plate 44 and the stationary guide plate 45. Each of the idling and driving rollers 46 and 47 is formed to have its diameter relatively small at the central portion thereof and increasing gradually to both end portions thereof from the central portion, and has a surface portion made of elastic material, such as rubber, soft plastics and so on. These idling and driving rollers 46 and 47 thus shaped form therebetween a space having its width relatively large at the center thereof and decreasing gradually to both ends thereof from the center when the idling and driving rollers 46 and 47 come into contact with each other at the end portions thereof. The disc D is got between the idling and driving rollers 46 and 47 after its front end is caught in the space formed between the idling and driving rollers 46 and 47.

The shaft of the idling roller 46 is supported to be rotatable by bearings mounted on the frame 30, and a shaft 48 of the driving roller 47 is supported to be rotatable by bearings mounted on the loading arm members 40 and 41, respectively. One end of the shaft 48 of the driving roller 47 supported by the bearing mounted on the loading arm member 40 projects outwardly from the loading arm member 40 to be provided thereon fixedly with a roller driving gear 50, as shown clearly in FIG. 5, so that the driving roller 47 is rotated in synchronism with the roller driving gear 50.

A motor 51 for rotating the roller driving gear 50 is attached to the loading arm member 40 and the rotation of the motor 51 is transmitted through intermediate gears 53 and 54 to the roller driving gear 50. In this connection, as shown in FIG. 4, a small gear 52 fixed on the rotating shaft of the motor 51 engages with a large toothed wheel 53a of the intermediate gear 53, a small toothed wheel 53b of the intermediate gear 53 engages with a large toothed wheel 54a of the intermediate gear 54, and a small toothed wheel 54b of the intermediate gear 54 engages with a large toothed wheel 50a of the roller driving gear 50, so that the driving roller 47 is driven by the motor 51 to be rotated.

As shown in FIGS. 4 and 5, a rotatable plate member 55 is attached to the shaft 48 of the driving roller 47 and an arm driving gear 56 is mounted to be rotatable through a pin 57 on the end portion of the rotatable plate member 55. This arm driving gear 56 is pushed by a leaf spring 58 toward the rotatable plate member 55, so that the side wall of a small toothed wheel 56b of the arm driving gear 56 is in frictional contact with the rotatable plate member 55. A large toothed wheel 56a of the arm driving gear 56 engages with a small toothed wheel 50b of the roller driving gear 50. Further, a washer 59 is put between the roller driving gear 50 and the rotatable plate member 55.

Figure 7:
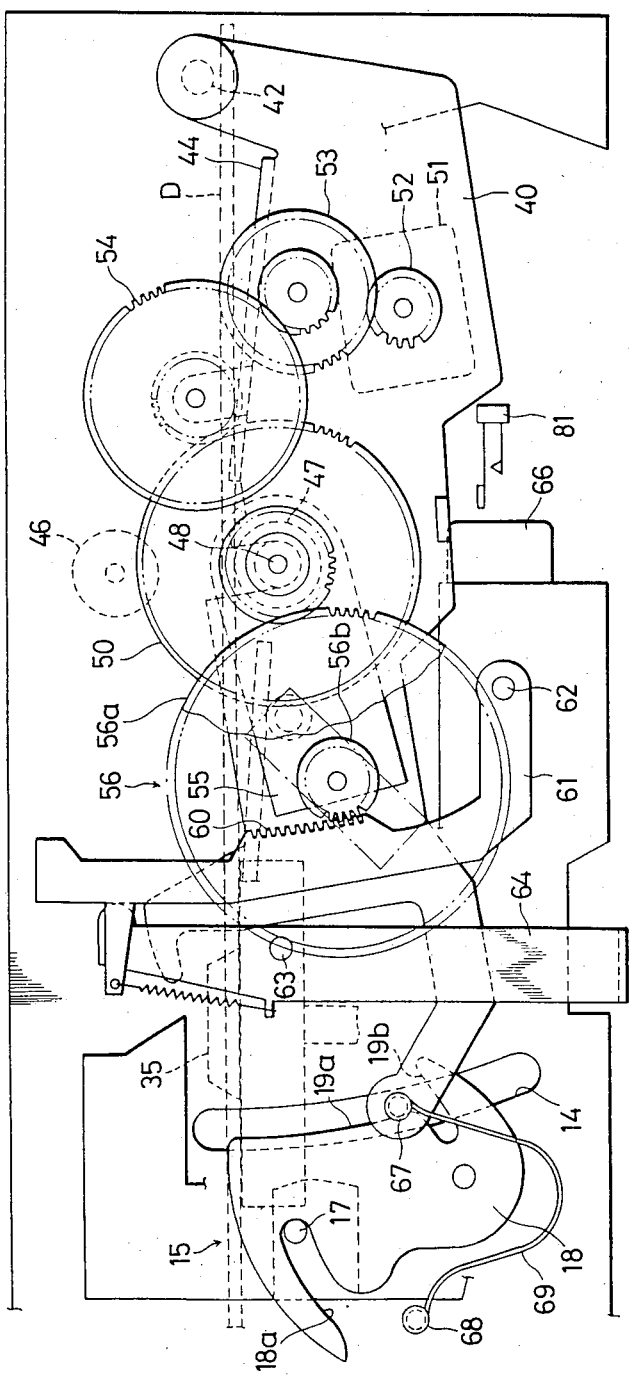

With such an arrangement as mentioned above, when the roller driving gear 50 is rotated, the rotatable plate member 55 and the arm driving gear 56 engaging frictionally with the rotatable plate member 55 are rotated together in the direction according to the rotation of the roller driving gear 50. The rotatable plate member 55 has a pin (not shown in Figs.) projecting to engage with a slit (not shown in Figs.) provided on the loading arm member 40 to elongate vertically, and these pin and slit are operative to restrict the movement of the rotatable plate member 55 within the moving range from the position where the rotatable plate member 55 lies in parallel with the loading arm member 40 as shown in FIG. 4 to the position where the rotatable plate member 55 is slanted downward as shown in FIG. 7. After the rotatable plate member 55 is stopped at the position where the rotatable plate member 55 is slanted downward as shown in FIG. 7, the arm driving gear 56 is driven by the roller driving gear 50 to rotate against the friction force arising between the small toothed wheel 56b of the arm driving gear 56 and the rotatable plate member 55.

A rack arm member 61 having a rack 60 engaging selectively with the small toothed wheel 56b of the arm driving gear 56 is pivoted on a pin 62 projecting from the frame 30, and a plunger lever 64 is also pivoted on a pin 63 projecting from the frame 30. These rack arm member 61 and plunger lever 64 are coupled with each other through a spring 65 and a projection 64a of the plunger lever 64 is in contact with the rack arm member 61, as shown in FIG. 4, so that the rack arm member 61 is rotated in accordance with the rotation of the plunger lever 64. One end of the plunger lever 64 is bent to be connected with a plunger 66 for rotating the rack arm member 61, as shown in FIG. 5.

A toggle spring 69 is laid between a pin 67 standing at the end portion of the loading arm member 40 and a pin 68 projecting from the frame 30. The elastic force of the toggle spring 69 acts on the loading arm member 40 to push up the same in the situation shown in FIG. 4, and the loading arm member 40 pushed up by the toggle spring 69 is prevented from rotating by the pin 63 which acts as a stopper for the loading arm member 40 and held at the position shown in FIG. 4. In this condition, the driving roller 47 is positioned to be in contact with the idling roller 46. On the side of the loading arm member 41, a toggle spring 69' which does its duty in the same menner as the toggle spring 69 is also laid between a pin 12 standing at the end portion of the loading arm member 41 and a pin 13 projecting from the frame 30, as shown in FIG. 6. Further, a switch 81 is provided under the loading arm member 40 to be engaged with the loading arm member 40 to detect the completion of the disc loading operation.

As shown in FIGS. 1 and 5, a pin 70 projects inwardly from the loading arm member 40 and the end portion of a engaging arm member 38b elongating from the clamping device 38 engages with the pin 70 to be put thereon. Accordingly, the clamping device 38 which is biased to tend to be close to the disc rotating device 35 as aforementioned is prevented from rotating by the pin 70 and therefore the clamping plate 39 provided at the end portioned of the clamping device 38 is positioned above the disc rotating device 35 in the situation shown in FIG. 4.

On the side of the loading arm member 40, a locking mechanism 15 is provided, and on the side of the loading arm member 41, another locking mechanism 16 is provided.

The locking mechanism 15 comprises a pin 17 projecting from the chassis 31 and a locking plate member 18 which is pivoted on a pin 72 projecting from the frame 30 and has a cut-out 18a for engaging selectively with the pin 17, as shown in FIG. 4. The locking plate member 18 is provided with a cam 19 having such a shape as shown in FIG. 4 and the cam 19 is in contact with the pin 67 standing on the loading arm member 40 so that the locking plate member 18 is driven to rotate by the loading arm member 40. The cam 19 is shaped to have an arc portion 19a coincident with the locus of movement of the pin 67 and a projecting portion 19b. Further, a shallow groove 14 is formed on the frame 30 to guide the pin 67 provided on the loading arm member 40.

In the locking mechanism 15 thus constituted, the locking plate member 18 is maintained to be in the locking state in which the cut-out 18a engages with the pin 17, as shown in FIG. 4, when the pin 67 provided on the loading arm member 40 moves along the arc portion 19a of the cam 19, and is driven to rotate in a predetermined direction when the pin 67 moves along the projecting portion 19b of the cam 19.

The locking mechanism 16 comprises projecting pieces 20a and 20b provided on the chassis 31, a locking plate member 22 having cut-outs 21a and 21b for engaging with the projecting pieces 20a and 20b, respectively, and a connecting plate member 23, as shown in FIG. 6. The locking plate member 22 is provided with openings 24a, 24b, 24c and 24d in which pins 25a and 25b projecting from the frame 30, the pin 13 projecting also from the frame 30 and a pin 23a projecting from the connecting plate member 23 are inserted, respectively. The connecting plate member 23 is positioned between the frame 30 and the locking plate member 22 and pivoted on a pin 26 projecting from the frame 30. Further, the connecting plate member 23 is provided with a cam 27 corresponding to the cam 19 provided to the locking plate member 18 and the cam 27 is in contact with the pin 12 standing on the loading arm member 41 so that the connecting plate member 23 is driven to rotate by the loading arm member 41. When the connecting plate member 23 is rotated, the pin 23a provided on the connecting plate member 23 causes the locking plate member 22 to move linearly.

Now, the operation of the disc loading apparatus according to the present invention constituted as mentioned above will be explained hereinafter.

When the disc D contained in the case 28 is inserted into the opening 2 for disc insertion and the lid 5 is made open by the disc D as shown in FIG. 2, the plunger 66 is caused to operate to rotate the plunger lever 64 in the counterclockwise direction. With this movement of the plunger lever 64, the rack 60 of the rack arm member 61 is moved to go away from the small toothed wheel 56b of the arm driving gear 56. Then, when the front end of the disc D reaches to the space between the idling roller 46 and the driving roller 47 after having passed through the space formed between the movable guide plate 44 and the stationary guide plate 45, an optical switch (not shown in Figs.) is turned on to cause the motor 51 to start rotating, so that the driving roller 47 is rotated. With the rotation of the driving roller 47, the disc D is carried by both of the idling roller 46 and tht driving roller 47 in the direction parallel to the top and buttom surfaces thereof toward the disc rotating device 35.

Figure 8:
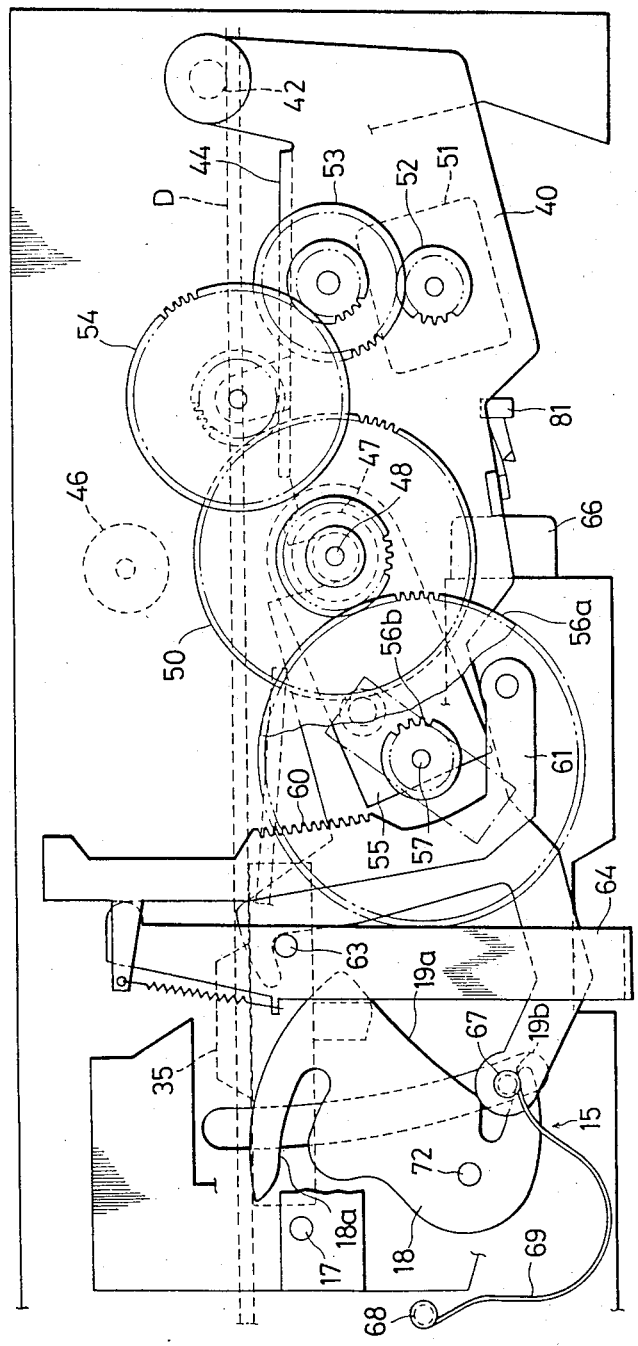

When the disc D carried toward the disc rotating device 35 reaches to the position where the front end of the disc D comes into contact with the pin-shaped stoppers 38a projecting downward from the clamping device 38, the photo-interrupter 80 is turned off to cause the plunger 66 to cease operating and therefore the plunger lever 64 and the rack arm member 61 return to their original positions, respectively. By this time, the rotatable plate member 55 has been rotated to be slanted downward and, in accordance with this, the small toothed wheel 56b of the arm driving gear 56 has been moved to the position where it can engage with the rack 60 of the rack arm member 61. Consequently, the rack 60 of the rack arm member 61 having returned to its original position engages with the small toothed wheel 56b. Then, the small toothed wheel 56b descends along the rack 60 of the rack arm member 61 and therefore the loading arm members 40 and 41 are rotated to move to a location where the loading arm member 40 takes such a position as shown in FIG. 8.

During such rotation of each of the loading arm members 40 and 41 as mentioned above, the driving roller 47 and the movable guide plate 44 descend together and accordingly the disc D put on the driving roller 47 descends toward the disc rotating device 35. When the loading arm members 40 and 41 reach to an intermediate location where the loading arm members 40 takes such a position as shown in FIG. 7, the disc D is put on the disc rotating device 35. Simultaneously, the engaging arm member 38b elongating from the clamping device 38 is released from the engagement with the pin 70 provided on the loading arm member 40, and consequently the clamping plate 39 clamps magnetically the disc D on the disc rotating device 35.

In the situation where the loading arm members 40 and 41 are at the above mentioned intermediate location, the pin 67 provided on the loading arm member 40 is in contact with the arc portion 19a of the cam 19 of the locking plate member 18 and therefore the locking plate member 18 is maintained to be in contact with the pin 17 projecting from the chassis 31, as shown in FIG. 7. Further, the locking plate member 22 is maintained also to be in contact with the projecting pieces 20a and 20b provided on the chassis 31. Accordingly, the chassis 31 is kept in the locked state and fixed substantially to the frame 30. As a result of this, during the disc loading operation performed in such a menner as described above, the relative movement between the frame 30 and the chassis 31 is prohibited.

After that, the loading arm members 40 and 41 are further rotated, and the driving roller 47 and the movable guide plate 44 descend to go way from the disc D loaded on the disc rotating device 35. Then, the samll toothed wheel 56b of the arm driving gear 56 passes through the rack 60 of the rack arm member 61 to be released from the engagement therewith, and the switch 81 is turned on by the loading arm member 40 to cause the motor 51 to cease rotating.

Figure 9:
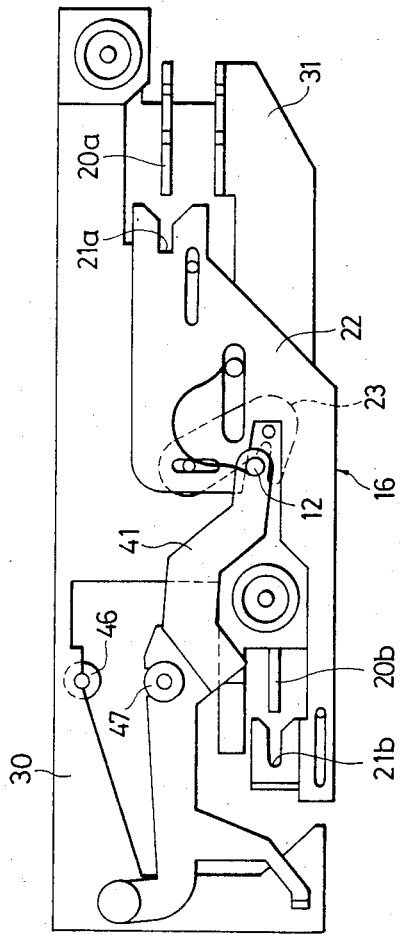
FIGS. 7, 8 and 9 are illustrations used for explaining the operation of the embodiment shown in FIG. 3.

In the period of such further rotation of the loading arm members 40 and 41, the locking plate members 18 and 22 are driven by the loading arm members 40 and 41, respectively, and then, as shown in FIGS. 8 and 9, released from the engagement with the pin 17 provided on the chassis 31 and the projecting pieces 20a and 20b provided on the chassis 31, respectively, when the driving roller 47 and the movable guide plate 44 have gone sufficiently away from the disc D loaded on the disc rotating device 35, so that the chassis 31 can move in relation to the frame 30 thereafter. Then, the condition in which the pin 67 provided on the loading arm member 40 is in contact with the projecting portion 19b of the cam 19 of the locking plate member 18 and the pin 12 provided on the loading arm member 41 is in contact with the end portion of the cam 27 of the connecting plate member 23, as shown in FIGS. 8 and 9, is maintained, so that the locking plate members 18 and 22 are kept to be away from the pin 17 provided on the chassis 31 and the projecting pieces 20a and 20b provided on the chassis 31, respectively.

After the disc loading operation is completed in the manner as described above, the information signal recorded on the disc D can be read by the optical reading head device 37.

Next, the disc unloading operation for removing the disc D from the disc rotating device 35 will be briefly described.

In the disc unloading opration, the motor 51 rotates in the direction opposite to the rotating direction in the disc loading operation to drive the roller driving gear 50 to rotate in the direction opposite to the rotating direction in the disc loading operation. Accordingly, the arm driving gear 56 is rotated in the direction opposite to the rotating direction in the disc loading operation, and therefore the rotatable plate member 55 is rotated so as to be parallel to the loading arm member 40 and the small toothed wheel 56b of the arm driving gear 56 comes into contact with the rack 60 of the rack arm member 61. The small toothed wheel 56b ascends along the rack 60, and then is released from the engagement with the rack 60. After that, the loading arm members 40 and 41 are pushed up by the toggle springs 69 and 69' to rotate to the positions shown in FIGS. 4 and 6, respectively.

With such rotation of the loading arm members 40 and 41, the locking plate members 18 and 22 are driven by the loading arm members 40 and 41 to come into contact with the pin 17 and the projecting pieces 20a and 20b provided on the chassis 31, respectively, so that the chassis 31 is kept again in the locked state and fixed substantially to the frame 30.

The disc D is relesased from clamping by the clamping plate 39 and removed from the disc rotating device 35 to be put between the driving roller 47 and the idling roller 46. In this case, since the chassis 31 is fixed substantially to the frame 30, the disc D can be surely released from clamping by the clamping plate 39. Then, the disc D is carried toward the opening 2 for disc insertion by the driving roller 47 and the idling roller 46. Then, the optical switch aforementioned is turned off to cause the motor 51 to cease rotating when the disc D reaches to a predetermined location, so that the disc D is situated to be taken out through the opening 2 for disc insertion.

What is claimed is:

1. An optical disc loading apparatus for use in an optical disc player having a disc rotating device, comprising:
    arm means movably supported by a frame between first and second positions,
    an upper roller rotatably mounted on said frame,
    a lower roller rotatably mounted on said arm means for moving a disc toward a first direction parallel to a plane of said disc in cooperation with said upper roller when said arm means is in said first position, and then moves downwardly beyond a plane of said disc rotating device for putting said disc on said disc rotating device free to be rotated thereby as said arm means moves from said first position to said second position,
    a chassis having said disc rotating device and an optical head carried thereon and supported by resilient members relative to said frame, and
    locking means including an engaging member provided on said chassis and a locking member provided on said frame for locking said chassis to said frame to engage with said engaging member when said arm means is at an intermediate third position between said first position and second position, and means on said arm means acting when said lower roller is moved downwardly beyond said plane of said disc rotating device, for unlocking said chassis relative to said frame to release the chassis from said engaging member in response to the movement of said arm means to said second position from said intermediate position.

2. An optical disc loading apparatus according to claim 1, wherein said arm means engage with said locking member to control the movement of the same in response to the movement of said arm member.

3. An optical disc loading apparatus according to claim 1 further comprising a motor for rotating said lower roller and for moving said arm means.

4. An optical disc loading apparatus according to claim 3 wherein said motor is mounted on said arm means.

5. An optical disc loading apparatus according to claim 1, wherein said arm means has a regulating member for regulating movement of a disc clamping device biased toward said disc rotating device to engage the latter.

6. An optical disc loading apparatus according to claim 2, wherein said arm means comprises a pair of loading arm members mounted on said frame parallel to each other, and between which said lower roller is rotatably mounted thereon.

* * * * *

UNITED STATES PATENT AND TRADEMARK OFFICE
CERTIFICATE OF CORRECTION

PATENT NO. : 4,628,498
DATED : December 9, 1986
INVENTOR(S) : Ryoji Takamatsu   Kouji Umezawa   Tsutomu Toyoguchi It is certified that error appears in the above-indentified patent and that said Letters Patent is hereby corrected as shown below:

```
Claim 1, column 10, line 42 "chassis" has been changed to
--locking member--.
```

Signed and Sealed this

Seventeenth Day of May, 1994

Attest:

BRUCE LEHMAN

Attesting Officer    Commissioner of Patents and Trademarks